United States Patent

[11] 3,607,649

[72] Inventors Masahiko Yoneda
Suita;
Makoto Kida, Fuse; Teluji Hemmi, Amagasaki; Ikuo Nogami, Kyoto; Akira Imada, Nishinomiya; Yuichi Takeuchi, Akashi; Einosuke Ohmura, Nishinomiya, all of Japan
[21] Appl. No. 834,933
[22] Filed June 11, 1969
[45] Patented Sept. 21, 1971
[73] Assignee Takeda Chemical Industries, Ltd. Osaka, Japan
[32] Priority Feb. 11, 1965
[33] Japan
[31] 40/7954
Continuation of application Ser. No. 525,289, Feb. 7, 1966, now abandoned.

[52] U.S. Cl. ............................................................ 195/28
[51] Int. Cl. ....................................................... C12d 13/06
[50] Field of Search ............................................. 195/28 N

[56] References Cited
UNITED STATES PATENTS
3,152,966 10/1964 Kinoshita et al. .............. 195/28 N
3,222,257 12/1965 Shiro et al. ..................... 195/28 N
3,268,415 8/1966 Kinoshita et al. .............. 195/28 N Primary Examiner—Alvin E. Tanenholtz
Attorney—Wenderoth, Lind & Ponack

[54] METHOD FOR THE PRODUCTION OF GUANOSINE AND 5'-GUANYLIC ACID
12 Claims, No Drawings ABSTRACT: 5'-guanylic acid, guanosine or a mixture thereof produced by culturing a mutant of Bacillus pumilus Gottheil, Bacillus megaterium de Bary or Brevibacterium ammoniagenes Breed which requires both (1) adenine and (2) an amino acid and/or a water-soluble vitamin.

METHOD FOR THE PRODUCTION OF GUANOSINE AND 5'-GUANYLIC ACID

This application is a continuation of application Ser. No. 525,289 filed Feb. 7, 1966 and now abandoned.

This invention relates to a method for the production of 5'-guanylic acid (hereinafter referred to as 5'–GMP) and guanosine. More particularly, this invention relates to a method for the production of 5'–GMP, guanosine or a mixture of 5'–GMP and guanosine, which comprises inoculating a mutant, which is induced from a micro-organism selected from the group consisting of *Bacillus pumilus* Gottheil, *Bacillus megaterium* de Bary and *Brevibacterium ammoniagenes* Breed and which requires for its growth both (1) adenine and (2) at least one of amino acid and vitamin, onto a culture medium containing the adenine source and at least one of the amino acid source and the vitamin source, incubating the culture medium until the desired substance has accumulated therein, and recovering the desired substance thus accumulated from the culture medium.

According to the present invention, the incubation of certain mutants induced from micro-organisms belonging to *Bacillus pumilus* Gottheil, *Bacillus megaterium* de Bary or *Brevibacterium ammoniagenes* Breed brings about accumulation of 5'–GMP and/or guanosine in a remarkably large amount in the culture medium, and the 5'–GMP and guanosine accumulated in this way are easily recoverable from the culture medium. The said mutants cannot grow on a minimal culture medium such as that mentioned in Table 1 (infra) on which wild-type strains of the mutants can grow, but they can grow on a culture medium prepared by the addition to the minimal culture medium of both (1) an adenine source and (2) an amino acid source such as vitamin free casein hydrolyzate and/or vitamin source containing water-soluble vitamins such as vitamin $B_1$, $B_2$, $B_6$, $B_{12}$, nicotinic acid amide, folic acid, nicotinic acid and pantothenic acid; in other words, the mutants require (1) adenine and (2) amino acid and/or vitamin for their growth.

Table 1

(Minimal culture medium)

| | |
|---|---|
| glucose | 10.0 grams |
| $K_2HPO_4$ | 3.0 grams |
| $KH_2PO_4$ | 1.0 gram |
| $Na_2SO_4$ | 1.0 gram |
| $MgSO_4$ | 0.2 gram |
| ferric citrate | 0.1 gram |
| biotin* | 20 milligrams |
| distilled water | 1 liter    pH 7.0 |

* Biotin is added only in the case of culturing *Bacillus pumilus* Gottheil.

The object of this invention is to provide a method for preparing 5'–GMP and/or guanosine, which can be efficiently put into practice on an industrial scale with a good yield. This object is realized by inoculating a mutant requiring (1) adenine and (2) amino acid and/or vitamin, of micro-organisms belonging to *Bacillus pumilus*, Gottheil, *Bacillus megaterium* de Bary or *Brevibacterium ammoniagenes* Breed in a culture medium containing both (1) an adenine source and (2) an amino acid source and/or a vitamin source, and incubating the culture medium. (Hereinafter the mutant mentioned above is referred to as "adenine- and amino acid- and/or vitamin-requiring mutant(s) of this invention").

Adenine- and amino acid- and/or vitamin-requiring mutant of this invention is induced by means of a *per se* conventional technique for the mutation of micro-organisms. More concretely stated, wild-type micro-organisms belonging to *Bacillus pumilus* Gottheil, *Bacillus megaterium* de Bary or *Brevibacterium ammoniagenes* Breed are treated, for example, with ultraviolet rays, X-rays, nitrogen mustard, nitrous acid, etc. Employment of a spontaneously induced adenine- and amino acid- and/or vitamin-requiring mutant of a micro-organism belonging to *Bacillus pumilus* Gottheil, *Bacillus megaterium* de Bary or *Brevibacterium ammoniagenes* Breed is also within the scope of this invention.

Adenine- and amino acid- and/or vitamin-requiring mutants of this invention are, for example, *Bacillus pumilus* Gottheil No. 152–C–7 (ATCC No. 19,217), *Bacillus pumilus* Gottheil No. 152–C–28 (ATCC No. 19,220), *Bacillus pumilus* Gottheil No. 152–C–30 (ATCC No. 19,219), *Bacillus megaterium* de Bary No. 211–46 (ATCC No. 19,218) and *Brevibacterium ammoniagenes* Breed No. 6–83 (ATCC No. 19,216). Throughout the present specification, "ATCC No." indicates an accession Number of American-Type Culture Collection (ATCC), Rockville, Md., U.S.A.

The biological characteristics of the above-mentioned mutants are as follows:

*Bacillus pumilus* Gottheil No. –C–7 (ATCC No. 19,217), No. 152–C–28 (ATCC No. 19,220 ) and No. 152–C–30 (ATCC No. 19,219):

The characteristics of these strains are the same as those of *Bacillus pumilus* Gottheil described in the seventh edition of "Bergey's Manual of Determinative Bacteriology," written by Robert S. Breed et al. and published by the Williams & Wilkins Company, except that these strains cannot grow on a minimal culture medium such as that mentioned in Table 1 (supra) on which *Bacillus pumilus* Gottheil can grow, but they can grow on a culture medium prepared by the addition to said minimal culture medium of both an adenine source and an amino acid source such a vitamin free casein hydrolysate [as amino acid, phenylalanine for *Bacillus pumilus* Gottheil No. 152–C–7 (ATCC No. 19,217), histidine for No. 152–C–28 (ATCC No. 19,220) and methionine for No. 152–C–30 (ATCC No. 19,219)].

*Bacillus megaterium* de Bary No. 211–46 (ATCC No. 19,218):

The characteristics of this strain are the same as those of *Bacillus megaterium* de Bary described in the aforesaid edition of "Begery's Manual of Determinative Bacteriology," except that this strain cannot grow on a minimal culture medium such as that mentioned in Table 1 on which *Bacillus megaterium* de Bary can grow, but this strain can grow on a culture medium prepared by the addition to said minimal culture medium of an adenine source, an amino acid source such as vitamin free casein hydrolysate (histidine as amino acid) and a vitamin mixture containing water-soluble vitamin such as vitamin $B_1$, $B_2$, $B_6$, $B_{12}$, nicotinic acid, nicotinic acid amide, folic acid, pantothenic acid and biotin.

*Brevibacterium ammoniagenes* No. 6–83 (ATCC No. 19,216):

The characteristics of this strain are the same as those of *Brevibacterium ammoniagenes* Breed described in the aforesaid edition of "Bergey's Manual of Determinative Bacteriology," except that this strain cannot grow on a minimal culture medium such as that mentioned in Table 1 on which *Brevibacterium ammoniagenes* Breed can grown, but this strain can grow on a culture medium prepared by the addition to said minimal culture medium of both an adenine source and an amino acid source such as vitamin free casein hydrolysate (tryptophane as amino acid).

For the purpose of the industrial production of 5'–GMP and/or guanosine by incubating adenine- and amino acid- and/or vitamin-requiring mutant of this invention, it is in general preferable to use a liquid culture medium. Generally, the incubation is carried out either under static conditions or as a submerged process under aeration and/or agitation, employing a culture medium necessarily containing both (1) an adenine source and (2) an amino acid source and/or a vitamin source. Desirably, the medium may contain assimilable carbon source(s) and digestible nitrogen source(s).

As the adenine source, there may be exemplified adenine itself, a compound which contains adenine component in its molecule and is easily convertible into adenine, or a natural substance containing the latter compound. For example, there may be employed adenine, adenosine, 3′-adenylic acid, succinoadenylic acid, meat extract, cornsteep liquor, polypeptone, and yeast extract.

As the amino acid source, there may be employed amino acid itself such as aspartic acid lysine, threonine, valine, alanine, methionine, histidine, cystine and leucine, peptide, or a natural substance containing such an amino acid as above and/or peptide such as casein hydrolysate, meat extract, polypeptone and yeast extract.

As vitamin sources, there may be employed water-soluble vitamin itself such as vitamin $B_1$, $B_2$, $B_6$, $B_{12}$, nicotinic acid, nicotinic acid amide, folic acid, pantothenic acid and biotin, a vitamin mixture containing said water-soluble vitamins, or natural substances containing said vitamin, such as yeast extract, polypeptone.

Natural substances containing an adenine source as well as amino acid source and a vitamin source e.g. soybean meal, meat extract, yeast extract, polypeptone, etc. are also generally employable.

As the assimilable carbon source, one or more of the compounds e.g. starch, dextrin, sucrose, lactose, maltose, glucose, glycerol, etc. may be used, and various organic compounds or organic materials such as organic ammonium salts, organic nitrates, urea, etc. may be used not only as the carbon source but also as the digestible nitrogen source in the same way as inorganic nitrogen source, for example, inorganic ammonium salts such as ammonium sulfate, ammonium carbonate, ammonium phosphate, or various kinds of nitrates such as sodium nitrate, potassium nitrate, etc. Furthermore, a small quantity of inorganic salts such as sodium chloride, phosphates, salts of metals such as calcium, zinc, manganese, iron may be added to the medium.

Adenine and amino acid sources and/or a vitamin source should be added to the culture medium in a sufficient amount for the growth of adenine- and amino acid- and/or vitamin-requiring mutant of this invention. Generally, an adenine source is added to the culture medium so as to make its concentration from about 5 mg./l. (milligrams per liter) to about 500 mg./l. when calculated in terms of adenine. The amino acid source is preferably added to the culture medium so as to make its concentration from about 50 mg./l. to about 5 g./l. when calculated in terms of vitamin free casein hydrolysate. The vitamin source is preferably added to the culture medium so as to make its concentration from about 2 mg./l. to about 200 mg./l. when calculated in terms of the vitamin mixture mentioned above.

Incubation conditions such as the pH of the medium and the incubation temperature should be controlled so as to accumulate the desired substance(s) in the maximum amount. Generally, the initial pH of the culture medium and the incubation temperature are respectively adjusted to 6.0–8.0 and to 20 to 40° C., preferably 28° C. to 37° C.

Under the above-mentioned culture conditions, the desired substance(s) is, or are, produced and accumulated in the culture medium with the lapse of time.

Incubation is continued until the maximum amount of the desired substance(s) is, or are, accumulated in the culture medium. Although the period required for the maximum accumulation of 5′-GMP and/or guanosine is changeable depending upon various factors, generally the amount of the desired substance(s) which has, or have, accumulated in the culture medium reaches a maximum usually between the 2nd day to 10th day from the start of the incubation.

5′-GMP and/or guanosine accumulated in the culture medium are recovered respectively or in admixture in a free state or in a state of the corresponding salt such as disodium salt, dipotassium salt by simple procedures, e.g. those employing activated charcoal or anion exchange resin.

Following examples are merely intended to illustrate presently preferred embodiments of this invention and not to restrict the scope thereof.

In the present specification as well as in the following examples, the abbreviations mg., g., ml., l. and ° C. refer respectively to milligram(s), gram(s), milliliter(s), liter(s) and degrees centigrade. Ratio and percentages are volume/volume unless otherwise described.

EXAMPLE 1

Adenine and amino acid double requiring mutant No. 152–C–7 (ATCC No. 19,217) is induced from *Bacillus pumilus* Gottheil No. 152 by irradiation with ultraviolet ray (15 watt) for 5 minutes from a height of 50 cm., followed by penicillin screening [Experientia 66, 41 (1960)] and replica plating [Journal of Bacteriology 63, 399 (1952)].

The *Bacillus pumilus* Gottheil No. 152–C–7 mutant (ATCC No. 19,217) obtained in this way is innoculated on 500 ml. of the complete medium mentioned below as Table 2, and this is followed by incubation under shaking at 37° C. for 24 hours:

Table 2

(Complete medium)

| | |
|---|---|
| vitaminfree casein hydrolysate | 8 grams |
| polypeptone | 2 grams |
| yeast extract | 5 grams |
| $K_2HPO_4$ | 3 grams |
| $KH_2PO_4$ | 1 gram |
| glucose | 5 grams |
| meat extract | 2 grams |
| NaCl | 2 grams |
| distilled water | 1 liter   pH 7.0 |

The culture broth obtained in this way is innoculated on 50 liters of the culture medium mentioned below as Table 3, and the medium is incubated with aeration and agitation at 37° C. for 72 hours. In the culture filtrate, 2.8 mg./ml. of 5′–GMP and 3.2 mg./ml. of guanosine are accumulated.

Table 3

(Culture medium)

| | |
|---|---|
| glucose | 20.0 grams |
| monosodium glutamate | 12.0 grams |
| $(NH_4)_2SO_4$ | 2.0 grams |
| $Na_2HPO_4$ | 5.0 grams |
| $KH_2SO_4$ | 2.0 grams |
| $Na_2SO_4$ | 1.0 gram |
| $MgSO_4$ | 0.2 gram |
| $CaCl_2$ | 0.1 gram |
| adenine | 0.025 gram |
| vitaminfree casein hydrolysate | 5.0 grams |
| distilled water | 1 liter   pH 7.5 |

The culture filtrate is adjusted to pH 2.5 to yield precipitates. After the precipitates are removed, the filtrate is allowed to pass through a column (50 cm. × 100 cm. CM.) packed with activated charcoal. 5′–GMP and guanosine are eluted completely with 100 liters of a mixture of methanol, ammonia and water (49:1:50). After concentration and adjustment of its pH to 8.0, the eluate is allowed to pass through a column (50 cm. × 100 cm.) packed with strongly basic anion exchange resin (chloride form, such as Dowex 1 × 8, made by the Dow Chemical Co., U.S.A.), whereby 5′–GMP and guanosine are adsorbed on the said anion exchange resin.

Guanosine adsorbed onto the anion exchange resin is eluted with 50 liters of 0.001 N-hydrochloric acid solution. The eluate is neutralized and followed by concentration under reduced pressure. Methanol is added to the resultant solution to make its final concentration 50 percent whereby precipitates are thrown down. The precipitates are recrystallized from hot water to give 121 g. of crude crystals of guanosine.

5'–GMP is eluted from the above-mentioned column by passing therethrough 25 liters of 0.01 N-hydrochloric acid solution. Thus-obtained fraction of 5'–GMP is allowed to pass through a column (25 cm. × 75 cm.) packed with activated charcoal, 5'–GMP is then eluted with 20 liters of a mixture of 2 percent ammonium solution and methanol (1:1). After concentration at pH 8.0, methanol is added to the eluate to make its concentration 60 percent. The resultant solution is cooled to 5° C. to yield 109 g. of crude crystals of disodium 5'–guanylate.

EXAMPLE 2

Adenine and amino acid double requiring mutant No. 152–C–28 (ATCC No. 19,220) is induced from *Bacillus pumilus* Gottheil No. 152 by irradiation with ultraviolet ray (10 watt), followed by penicillin screening (described above) and replica plating (described above).

The *Bacillus pumilus* Gottheil No. 152–C–28 mutant (ATCC No. 19,220) obtained in this way is innoculated on 500 ml. of complete medium of Table 2 of example 1, followed by incubation with shaking at 37° C. for 24 hours. The resulting culture broth is innoculated on 50 liters of culture medium of the same composition as that mentioned as table 3 in example 1 and incubated with aeration and agitation at 37° C. for 72 hours. In the culture filtrate, there are accumulated 4.7 mg./ml. of 5'–GMP.

Then the culture filtrate is adjusted to pH 2.5. After the resulting precipitates are removed, the filtrate is allowed to pass through a column (50 cm. × 100 cm.) packed with activated charcoal. 5'–GMP is eluted with 40 liters of a mixture of methanol, ammonia and water (49:1:50). After concentration and adjustment of its pH to 8.0, the eluate is allowed to pass through a column (25cm. × 75 cm.) packed with strongly basic anion exchange resin (formic acid type, such as Dowex 1 × 8, Dow Chemical Co., U.S.A.). After the column is washed with water, 5'–GMP is eluted from the column by passing first therethrough 150 liters of a mixture of 0.05 N-sodium formate solution and 0.01 N-formic acid solution (1:1), followed by 150 liters of a mixture of 0.1 N-sodium formate solution and 0.1 N-formic acid solution (1:1). Thus-obtained fraction of 5'–GMP is allowed to pass through a column (25 cm. × 50 cm.) packed with activated charcoal, and then objective substance is eluted with a mixture of 20 percent ammonium hydroxide solution, methanol and water (5:50:45). After concentration of the eluate, hot (about 60° C.) methanol is added thereto to make its concentration 50 percent. The resultant solution is cooled to 5° C. to yield 187 g. of crude crystals of disodium 5'–guanylate.

EXAMPLE 3

Adenine and amino acid double requiring mutant No. 152–C–30 (ATCC No. 19,219) is induced from *Bacillus pumilus* Gottheil No. 152 by irradiation with X-ray (50,000 roentgen), followed by penicillin screening (described above) and replica plating (described above).

The mutant is innoculated on 500 ml. of the culture medium mentioned below, followed by incubation under shaking at 30° C. for 24 hours:

Culture medium

| | |
|---|---|
| glucose | 50 grams |
| NH$_4$cl. | 40 grams |
| KN$_2$PO$_4$ | 1 gram |
| MgSO$_4$ | 0.2 gram |
| FeSO$_4$ | 0.01 gram |
| vitaminfree casein hydrolysate | 2 grams |
| yeast extract | 3 grams |

Table — Continued

| | | |
|---|---|---|
| polypeptone | 1 gram | |
| corn steep liquor | 2 grams | |
| distilled water | 1 liter | pH 8.0 |

The resultant culture broth is innoculated on 50 liters of the culture medium of the same composition as mentioned above, and incubated with aeration and agitation at 30° C. for 96 hours. In the culture filtrate, there are found 6.3 mg./ml. of guanosine.

The culture filtrate is then adjusted to pH 2.5 to yield precipitates. After the removal of the precipitates, the filtrate is allowed to pass through a column (50 cm. × 100 cm.) packed with activated charcoal. Guanosine is eluted completely with a mixture of methanol, ammonia and water (49:1:50). After concentration and adjustment to a pH of 8.0 the eluate is allowed to pass through a column (25 cm. × 75 cm.) packed with strongly basic anion exchange resin (formic acid type, such as Dowex 1 × 8, the Dow Chemical Co., U.S.A.), whereby a portion of the guanosine is adsorbed on the said anion exchange resin and the rest is left in the effluent. Guanosine adsorbed on the anion exchange resin is eluted with a 0.005 N-formic acid solution. The eluate is mixed with the effluent. After concentration of the mixture, ethanol is added to adjust the concentration to 50 percent, whereby precipitates are obtained. The precipitates are recrystallized from hot water to yield 231 g. of crude crystals of guanosine.

EXAMPLE 4

Mutant No. 211–46 (ATCC No. 19,218) is induced from *Bacillus megaterium* de Bary No. 211 by irradiation with ultraviolet ray (5 watt) for 5 minutes from 50 cm. height, followed by penicillin screening (described above) and replica plating (described above).

So-obtained *Bacillus megaterium* de Bary No. 211–46 (ATCC No. 19,218) requires each of (1) adenine, (2) amino acid and (3) vitamin.

The mutant is innoculated on 500 ml. of culture medium mentioned below, followed by incubation with shaking at 30° C. for 24 hours:

Culture medium

| | | |
|---|---|---|
| glucose | 20.0 grams | |
| monosodium glutamate | 12.0 grams | |
| (NH$_4$)$_2$SO$_4$ | 2.0 grams | |
| Na$_2$HPO$_4$ | 5.0 grams | |
| NaH$_2$PO$_4$ | 2.0 grams | |
| Na$_2$SO$_4$ | 1.0 gram | |
| MgSO$_4$ | 0.2 gram | |
| CaCl$_2$ | 0.1 gram | |
| adenine | 0.025 gram | |
| vitaminfree casein hydrolysate | 5.0 grams | |
| vitamin mixture* | 10 grams | |
| distilled water | 1 liter | pH 8.0 |

*The vitamin mixture consists of vitamin B$_1$, vitamin B$_2$, vitamin B$_6$, vitamin B$_{12}$, nicotinic acid amide, folic acid, nicotinic acid, pantothenic acid and biotin.

The resultant culture broth is innoculated on 50 liters of the culture medium of the same composition as mentioned above, and incubated with aeration and agitation at 30° C. for 120 hours. In the culture filtrate, 1.5 mg./ml. of guanosine is accumulated. The culture filtrate is allowed to pass through a column (50 cm. × 100 cm.) packed with activated charcoal which was previously treated with 2 percent hydrochloric acid. After the column is washed with water, guanosine is eluted from the column by passing therethrough 40 liters of a mixture of methanol, ammonia and water (50:1:49) at a slow rate. Thus-obtained fraction of guanosine is concentrated to give 58.5 g. of crude crystals of guanosine.

EXAMPLE 5

*Bacillus megaterium* de Bary No. 211–46 (ATCC No. 19,218) is innoculated on 50 ml. of the culture medium of the same composition as employed in example 4, followed by incubation under shaking at 37° C. for 22 hours. The resultant culture broth is innoculated on 500 ml. of the culture medium of the same composition as mentioned above, and incubated with aeration and agitation at 37° C. for 96 hours. In the culture filtrate, 4.5 mg./ml. of guanosine is accumulated.

The culture filtrate is treated after the manner described in example 4 to obtain 180.3 g. of crystals of guanosine.

EXAMPLE 6

Adenine and amino acid double requiring mutant No. 6–83 (ATCC No. 19,216) is induced from *Brevibacterium ammoniagenes* Breed No. 6 by irradiation of ultraviolet ray (15 watt) for 3 minutes from 50 cm. height, followed by penicillin screening (described above) and replica plating (described above).

The mutant is innoculated on 500 ml. of the culture medium of the same composition described in example 1 as as 1, followed by incubation with shaking at 28° C. for 24 hours. The resultant culture broth is innoculated on 50 liters of the culture broth of the same composition described in example 1 as table 2 and incubated with aeration and agitation at 28° C. for 72 hours. In the culture filtrate, 1.8 mg./ml. of guanosine and 1.2 mg./ml. of 5'-GMP are accumulated. The culture filtrate is treated after the manner described in example 1 to obtain 71.8 g. of crude crystals of guanosine and 45.3 g. of crude crystals of disodium 5'-guanylate.

EXAMPLE 7

*Brevibacterium ammoniagenes* Breed No. 6–83 (ATCC No. 19,216) is innoculated on 500 ml. of culture medium mentioned below, followed by incubation with shaking at 28° C. for 24 hours:

Culture medium

| | |
|---|---|
| mannose | 20 grams |
| monosodium glutamate | 12.0 grams |
| $(NH_4)_2SO_4$ | 2.0 grams |
| $Na_2HPO_4$ | 5.0 grams |
| $KH_2PO_4$ | 2.0 grams |
| $Na_2SO_4$ | 1.0 gram |
| $MgSO_4$ | 0.2 gram |
| $CaCl_2$ | 0.1 gram |
| adenine | 0.025 gram |
| vitaminfree casein hydrolystate | 5.0 grams |
| distilled water | 1 liter    pH 7.0 |

The resultant culture broth is innoculated on 50 liters of the culture medium of the same composition as described above, and incubated with aeration and agitation at 28° C. for 96 hours. In the culture filtrate, 2.8 mg./ml. of guanosine and 2.2 mg./ml. of 5'-GMP are accumulated.

The culture filtrate is treated after the manner described in example 1 to yield 116.9 g. of crude crystals of guanosine and 88.2 g. of crude crystals of disodium 5'-guanylate.

What is claimed is:

1. A method for producing 5'-guanylic acid, guanosine or a mixture thereof, which comprises inoculating a mutant, which is induced from a micro-organism selected from the group consisting of *Bacillus pumilus* Gottheil, *Bacillus megaterium* de Bary and *Brevibacterium ammoniagenes* Breed and which requires both (1) adenine and (2) amino acid selected from the group consisting of aspartic acid, lysine, threonine, valine, alanine, methionine, histidine, crystine, leucine, phenylalanine, tryptophane and a mixture thereof and/or a water-soluble vitamin selected from the group consisting of vitamin $B_1$, $B_2$, $B_6$, $B_{12}$, nicotinic acid, nicotinic acid amide, folic acid, pantothenic acid and a mixture thereof, onto a culture medium containing both (1) adenine source and (2) source of the said amino acid and/or source of the said water-soluble vitamin, incubating the culture medium until objective substance is accumulated therein, and recovering the desired substance from the culture medium.

2. A method according to claim 1, wherein the mutant is incubated in a culture medium containing adenine source, at least one of the amino acid source and vitamin source, assimilable carbon source, digestible nitrogen source and other nutrients enhancing the growth of the mutant at a temperature of from about 20° C. to about 45° C. under aerobic conditions.

3. A method according to claim 2, wherein the mutant is induced from *Bacillus pumilus* Gottheil.

4. A method according to claim 2, wherein the mutant is induced from *Bacillus megaterium* de Bary.

5. A method according to claim 2, wherein the mutant is induced from *Brevibacterium ammoniagenes* Breed.

6. A method according to claim 2, wherein the mutant is *Bacillus pumilus* Gottheil No. 152–C–7 (ATCC No. 19,217).

7. A method according to claim 2, wherein the mutant is *Bacillus pumilus* Gottheil No. 152–C–28 (ATCC No. 19,220).

8. A method according to claim 2, wherein the mutant is *Bacillus pumilus* Gottheil No. 152–C–30 (ATCC No. 19,219).

9. A method according to claim 2, wherein the mutant is *Bacillus megaterium* de Bary No. 211–46 (ATCC No. 19,218).

10. A method according to claim 2, wherein the mutant is *Brevibacterium ammoniagenes* Breed No. 6–82 (ATCC nO. 19,216).

11. A method for producing 5'-guanylic acid, guanosine or a mixture thereof, which comprises inoculating a mutant, which is induced from a micro-organism selected from the group consisting of *Bacillus pumilus* Gottheil and *Bacillus megaterium* de Bary and which requires both (1) adenine and (2) amino acid selected from the group consisting of aspartic acid, lysine, threonine, valine, alanine, methionine, histidine, cystine, leucine, phenylalanine, tryptophane and a mixture thereof and/or a water-soluble vitamin selected from the group consisting of vitamin $B_1$, $B_2$, $B_6$, $B_{12}$, nicotinic acid, nicotinic acid amide, folic acid, pantothenic acid and a mixture thereof, onto a culture medium containing both (1) adenine source and (2) source of the said amino acid and/or source of the said water-soluble vitamin, incubating the culture medium until objective substance is accumulated therein, and recovering the desired substance from the culture medium.

12. A method according to claim 11, wherein the mutant is incubated in a culture medium containing adenine source, at least one of the amino acid source and vitamin source, assimilable carbon source, digestible nitrogen source and other nutrients enhancing the growth of the mutant at a temperature of from about 20° C. to about 45° C. under aerobic conditions.